J. F. CRAWFORD.
SECURING WHEELS UPON SHAFTING.

No. 173,716. Patented Feb. 22, 1876.

Witnesses:
Donn Twitchell.
Hill H. Dodge.

Inventor:
J. F. Crawford,
by Dodge & Son,
Attys.

UNITED STATES PATENT OFFICE.

JOSEPH F. CRAWFORD, OF CAZENOVIA, NEW YORK.

IMPROVEMENT IN SECURING WHEELS UPON SHAFTING.

Specification forming part of Letters Patent No. 173,716, dated February 22, 1876; application filed February 5, 1876.

*To all whom it may concern:*

Be it known that I, JOSEPH F. CRAWFORD, of Cazenovia, in the county of Madison and State of New York, have invented certain Improvements in Securing Wheels upon Shafting, of which the following is a specification:

My invention consists in providing the wheel or equivalent with a radially-sliding key and a nut for moving the same, whereby the wheel may be quickly fastened and released.

Figure 1:
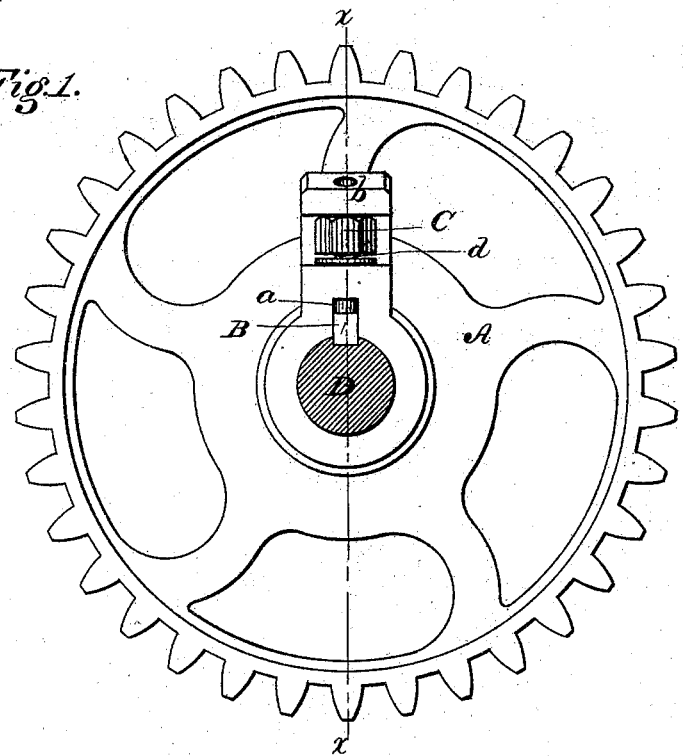
Figure 2:
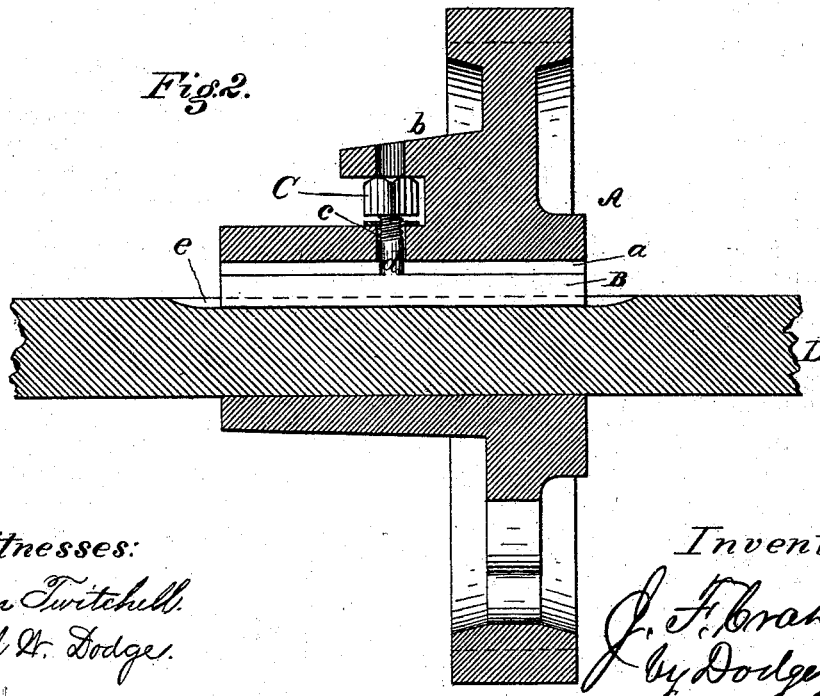

Figure 1 is a side view of a wheel provided with my improvement and fastened upon its shaft; Fig. 2, a central cross-section of the same.

A represents the wheel, having its key-seat or slot $a$ cut radially to such depth that the key can rise therein out of the seat or slot in the shaft. The wheel is also provided on one side outside of the hub with a lateral arm, $b$, and also has a hole, $c$, leading from the seat $a$ outward below the arm $b$, as shown. B represents the key, provided at its middle with the screw-stem $d$, as shown, and seated in the seat or slot $a$, with the stem $d$ extending outward through the hole $c$. C represents a nut seated between the hub of the wheel and the arm $b$, and working upon the screw-stem of the key, as shown. D represents the shaft on which the wheel is mounted, provided with the usual longitudinal groove $e$, to receive the edge of the key. The pulley is secured by simply sliding it upon the shaft, and then turning the nut, so as to force the key down into its seat in the shaft, and is released by simply turning the nut in the reverse direction to raise the key out of the seat.

The invention consists in so arranging the key that it can be raised out of the seat in the shaft without being removed from the wheel, and in so applying the nut that it serves both to raise and lower the key.

It is obvious that the form and arrangement of the parts may be varied, as circumstances require, without departing from the limits of my invention.

The screw-neck may be in the middle of the key, as shown, or at one end of the same, or there may be one at each end.

In order to compensate for the removal of metal in cutting the deep key-seat in the wheel I enlarge the hub of the wheel on one side, and also extend it lengthwise, as shown, thus giving the wheel its usual strength, and preventing all danger of a fracture at the seat. By my arrangement of the key and nut I am enabled to secure and release the wheel quickly, easily, and without hammering or bruising the parts.

It is obvious that my improvement is applicable not only to gear wheels, but also to band-wheels, pulleys, clutches, couplings, &c.

Having described my invention, what I claim is—

1. The combination of a wheel, A, or its equivalent, a radially-sliding key, B, and a nut, C, substantially as shown and described.

2. In combination with a shaft, D, the wheel A, or its equivalent, provided with the radially-sliding key B, capable of rising from its seat in the shaft without being removed from the wheel.

3. The wheel A, provided with the deep seat $a$, arm $b$, and hole $c$, as and for the purpose described.

JOSEPH F. CRAWFORD.

Witnesses:
EZEKIEL P. MORE,
E. N. WILSON.